A. AND A. A. MIELOCH.
SPREADER FOR TIRE CASINGS.
APPLICATION FILED SEPT. 19, 1919.
1,342,565.
Patented June 8, 1920.
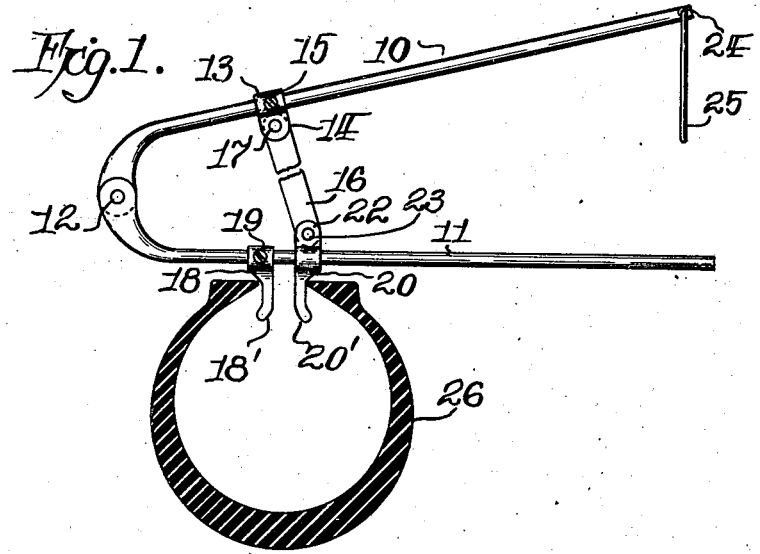
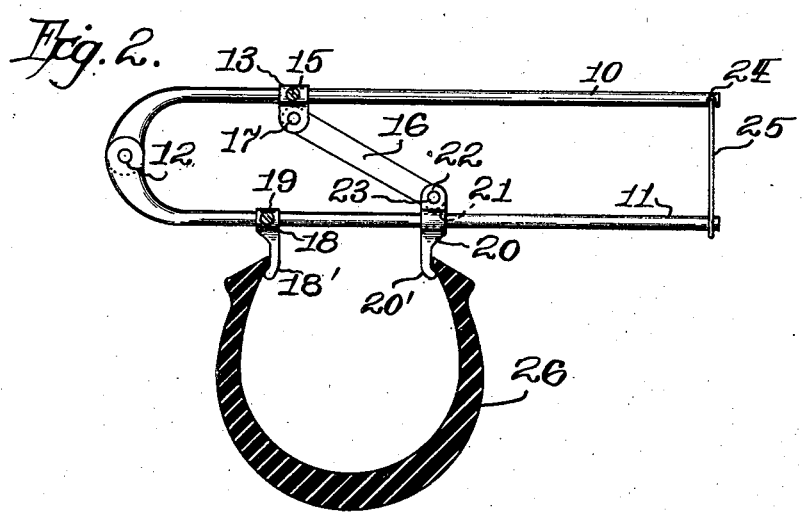
Inventors: Andrew Mieloch,
Anton A. Mieloch,
by: John E. Styles
Attorney.

UNITED STATES PATENT OFFICE.

ANDREW MIELOCH AND ANTON A. MIELOCH, OF ST. PAUL, MINNESOTA.

SPREADER FOR TIRE-CASINGS.

1,342,565.   Specification of Letters Patent.   Patented June 8, 1920.

Application filed September 19, 1919. Serial No. 324,769.

*To all whom it may concern:*

Be it known that we, ANDREW MIELOCH and ANTON A. MIELOCH, citizens of the United States, residing at St. Paul, in the county of Ramsey and State of Minnesota, have invented a new and useful Spreader for Tire-Casings, of which the following is a specification.

Our invention relates to spreaders for pneumatic tires adapted to open a casing for the purpose of vulcanizing or otherwise repairing the same.

The object of our invention is to provide an efficient and easily adjustable tool to open or spread a pneumatic tire casing for the purpose of vulcanizing or otherwise repairing the same.

A further object is to provide a tool which may be manipulated from outside the casing, without unnecessarily handling the same.

Our invention is illustrated in the accompanying drawings, in which Figure I is a view of our tire spreader showing the parts in position to apply to a casing, which is illustrated in cross section. Fig. II is a view of the spreader showing the levers in locked position and the casing (shown in cross section) open.

A pair of levers 10 and 11, each of which is curved at one end, are articulated together at said ends by means of a pivot 12 after the fashion of a pair of fire tongs. Upon the lever 10 an annular sleeve 13, formed with a pair of projecting ears 14, is fixed by means of a set-screw 15. In the bifurcated ears 14 of the sleeves 13 one end of the stretcher bar 16 is journaled by the pintle 17. On the lever 11 the spreader head 18 is fixed by means of a set-screw 19, which passes through an annular sleeve formed on said head. A movable spreader head 20, also formed with an annular sleeve 21 adapted to slide on said lever 11, is provided with a bifurcated flange 22 between the legs of which the lower end of the stretcher bar 16 is journaled by means of the pin 23. The heads 18 and 20 are each provided with a curved prong 18' and 20', adapted to engage the inner surface of a tire casing, as shown in the drawings. The outer end of the lever 10 is perforated at 24, and in this perforation a ring 25 is suspended in position to be slipped over the end of the lever 11 when that lever is brought into parallel relation with the lever 10.

In operation the levers are spread apart and the heads 18 and 20 are inserted in the casing 26, as shown in Fig. I. The outer ends of the levers are then pressed together whereby the spreader bar 16 pushes the head 20 outwardly upon the lever 11 and opens the casing, when the ring 25 may be slipped over the lever 11 to rigidly hold the levers in parallel relation and the casing in open position, as shown in Fig. II.

Having described our invention what we claim as new and desire to protect by Letters Patent is:

1. A tire spreader comprising a pair of hinged levers, a pair of ears fixed upon one of said levers, a fixed head and a sliding head upon the companion lever, a spreader bar articulated at one end in said ears and at the other in said sliding head and a ring attached to the outer end of one of said levers and adapted to slip over the other.

2. A tire spreader comprising a pair of hinged levers, a spreader bar articulated at one end at a fixed point upon one of said levers, a fixed prong and a sliding prong upon the companion lever, said spreader bar being pivotally connected to said sliding prong, and means for holding the levers in parallel relation to each other.

3. A tire spreader comprising a pair of hinged levers, a spreader bar articulated at one end at a fixed point upon one of said levers, a sleeve pivoted to the opposite end of said spreader bar and slidable on the second lever, a prong on said sleeve, a second prong fixed on said second lever and a ring attached to one of said levers, adapted to slip over the other.

In testimony whereof, we have hereunto subscribed our names to this specification.

ANDREW MIELOCH.
ANTON A. MIELOCH.